Dec. 18, 1962    M. H. WARD    3,068,607
MINNOW CONTAINER AND SYSTEM
Filed March 15, 1961    3 Sheets-Sheet 1
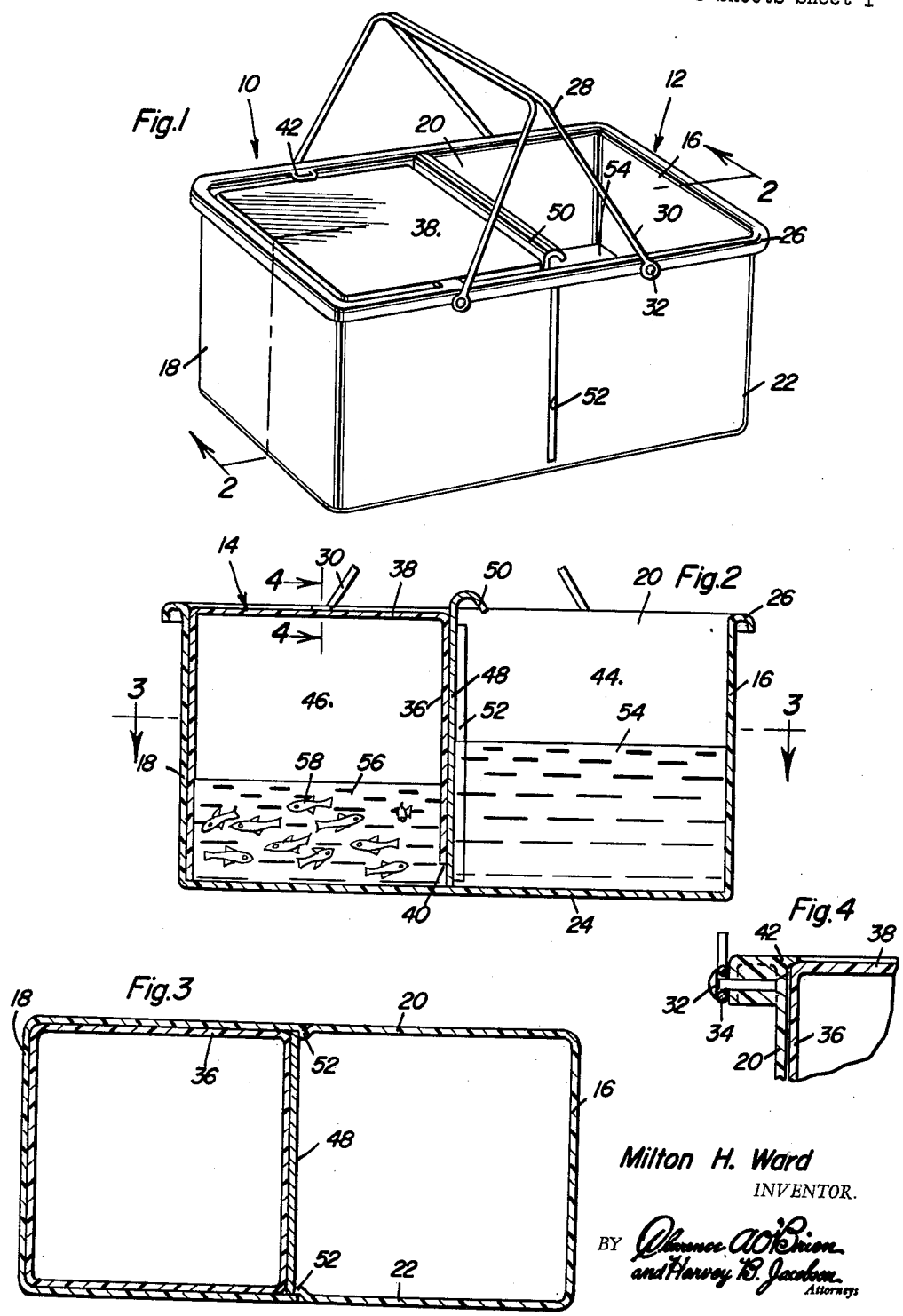
Milton H. Ward
INVENTOR.

Dec. 18, 1962 M. H. WARD 3,068,607
MINNOW CONTAINER AND SYSTEM
Filed March 15, 1961 3 Sheets-Sheet 2

Milton H. Ward
INVENTOR.

BY Clarence A. O'Brien
and Harvey B. Jacobson
Attorneys

Dec. 18, 1962     M. H. WARD     3,068,607
MINNOW CONTAINER AND SYSTEM

Filed March 15, 1961     3 Sheets-Sheet 3

Milton H. Ward
INVENTOR.

BY *Clarence A. O'Brien*
*and Harvey B. Jackson*
Attorneys

United States Patent Office 3,068,607
Patented Dec. 18, 1962

3,068,607
MINNOW CONTAINER AND SYSTEM
Milton H. Ward, % Duracraft Boats Inc.,
Monticello, Ark.
Filed Mar. 15, 1961, Ser. No. 95,895
8 Claims. (Cl. 43—56)

The present invention generally relates to a system of retaining minnows in a live condition so that such minnows may be employed for bait and more particularly includes a novel container assembly for retaining a supply of oxygen entrapped along with a quantity of water and a number of minnows so that the minnows will be retained in a live condition.

The primary object of the present invention is to provide a novel minnow container and a novel system of assembling the containers together with a supply of oxygen, water and minnows so that the oxygen will be entrapped in an inverted container and the minnows will be available by a trap door which is movable to a closed or openable position so that the minnows may be accessible to persons desiring to use the minnows as bait.

Still another important object of the present invention is to provide a novel minnow container assembly including an enlarged receptacle having an inverted smaller receptacle therein in which the inverted smaller receptacle is provided with an initially contained supply of oxygen, water and minnows in a flexible plastic bag whereby the plastic bag may be moved after inversion of the container receiving the supply of oxygen, water and minnows so that the retaining bag may be removed while retaining the oxygen, minnows and water entrapped within the inverted container thereby maintaining an oxygen supply for keeping the minnows alive for extended periods of time.

Still another feature of the present invention is the provision of a novel minnow container preferably constructed of inexpensive material such as plastic or the like and which is relatively inexpensive to manufacture, easy to use, effective for its particular purposes and generally long lasting and well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the minnow container of the present invention;

FIGURE 2 is a longitudinal, vertical sectional view taken substantially upon a plane passing along section line 2—2 of FIGURE 1 illustrating the details of construction thereof;

FIGURE 3 is a longitudinal, plan sectional view taken substantially upon a plane passing along section line 3—3 of FIGURE 2 illustrating the relationship of the components of the invention;

FIGURE 4 is a detailed sectional view illustrating the manner in which the inverted receptacle or container is releasably retained in place;

Figure 5:
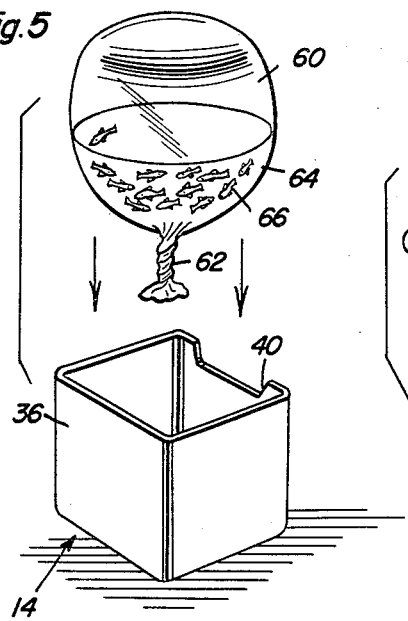
FIGURE 5 is an exploded group perspective view illustrating the manner in which the plastic bag having a supply of oxygen, water and minnows therein is placed in the invertible container.

Referring now specifically to the drawings, the numeral 10 generally designates the container assembly of the present invention which includes an enlarged container or receptacle 12 and an inverted container or receptacle 14.

The enlarged container 12 is generally rectangular in plan configuration and includes vertical end walls 16 and 18, vertical side walls 20 and 22 and a horizontal bottom wall 24 interconnecting the end and side walls thereby defining an open top container. The top edge of the walls 16—22 are each provided with an outwardly and downwardly extending flange 26 which forms a smooth rounded edge for the top of the container 12 and also forms a reinforcement for the container. The container 12 may be constructed of any suitable material such as plastic, sheet metal or the like.

Attached to the flange 26 is a pair of U-shaped wire bails or handles 28 having parallel legs 30 pivotally attached to the depending edge of the flange 26 by virtue of pivot bolts or fasteners 32. The lower ends of the legs 30 have loops or eyes 34 formed thereon thus forming a hinge connection for the handles or bails 28 so that they may be pivoted to an out-of-the-way position in which the bight portions are disposed against the outer surface of the respective end walls.

The inverted container 14 is substantially one-half the size of the container 12 and includes substantially equal size side walls 36 and a top wall 38 which forms an open bottom which is engaged with the inner surface of the bottom 24 of the container 12 when the container 14 is assembled with the container 12. One of the side walls 36 is provided with a notch or recess 40 extending from the free edge thereof for a purpose described hereinafter.

Means is provided for retaining the container 14 assembled with the container 12 when in inverted position and this means may conveniently take the form of a pair of oppositely disposed inwardly extending lugs 42 which frictionally engage the container 14 when it is inserted into the container 12 and which snap over the corner area of the upper edge of the container 14 as illustrated in FIGURE 4 for effectively retaining the container 14 within the container 12 but yet enabling the receptacle 14 to be removed when desired by either springing the side walls 20 and 22 slightly outwardly or otherwise forcing the container 14 upwardly beyond the lugs 42.

When assembling the container 14 of the container 12, the side wall 36 having the notch 40 therein is disposed generally at the center of the container 12. Thus, the container 12 is divided into two separate compartments including an open topped compartment 44 and a closed compartment 46 in the upper portion of the inverted container 14.

A sliding gate 48 is provided for forming a closure for the notch or recess 40 and the upper end of the gate 48 is provided with a reversely bent handle 50. The gate 48 is slidably disposed against the wall 36 having the notch or recess 40 therein and also engages the surface of a pair of inwardly projecting vertical projections 52 formed in the side walls 20 and 22 respectively thereby forming vertical guides for the vertically reciprocating plate or gate 48.

In the compartment 44, there is provided a supply of water 54 while in the container 14, there is provided a supply of water 56, a plurality of minnows 58 and a supply of oxygen entrapped above the surface of the water 36.

The manner of entrapping the oxygen within the container 14 is illustrated in FIGURES 5–9 and includes the use of a flexible plastic bag 60 having a loosely twisted closure 62 and a supply of water 64, a plurality of minnows 66 and a supply of oxygen therein. This assembly is positioned in the container 14 when the open bottom is uppermost in the manner illustrated in FIGURE 5, that is, with the twisted top 62 being disposed downwardly so that the finished condition will have the appearance as illustrated in the bottom portion of FIGURE 6.

Figure 6:
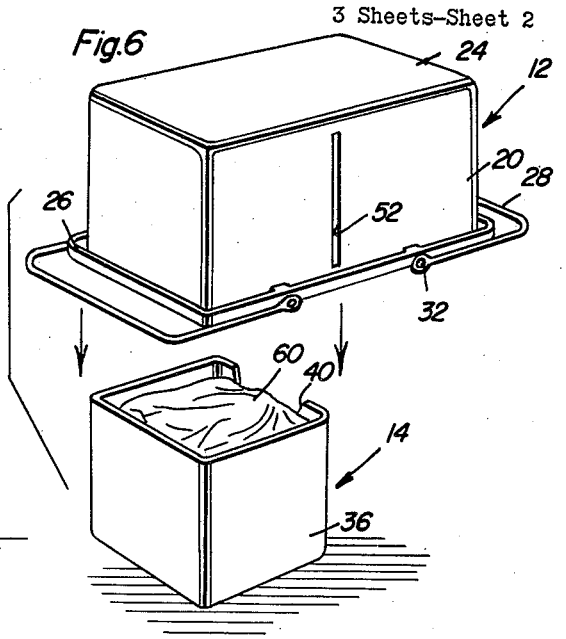
FIGURE 6 is an exploded group perspective view of the invertible container and the enlarged container illustrating the manner of assembly.
Figure 7:
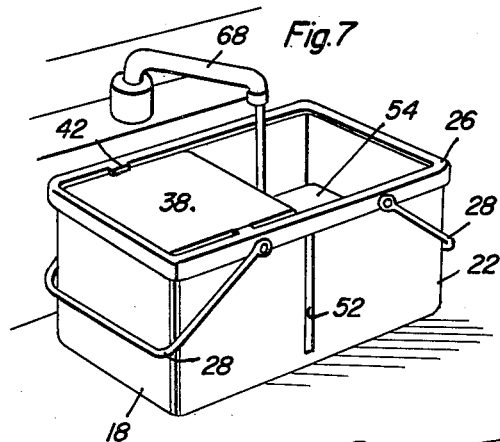
FIGURE 7 is a perspective view of the assembled containers illustrating the manner in which the assembly is partially filled with water.
Figure 8:
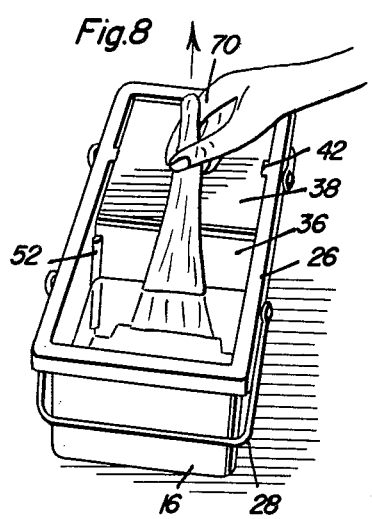
FIGURE 8 is a perspective view illustrating the manner in which the plastic bag is removed from the inverted container while the oxygen is entrapped in the uppermost portion of the inverted container.

After the plastic bag assembly has been placed in the inverted container 14, the container 12 is inverted and placed down over the container 12 in the manner illustrated in FIGURE 6. This assembly is then inverted and, of course, the plastic bag 60 will prevent escape of the oxygen as well as the minnows. The compartment 44 of the container is then partially filled with water 54 from a suitable supply faucet 68 or the like with the lugs 42 serving to retain the container 14 in place. After a quantity of water 54 has been placed in the compartment 44, the fingers 70 of a person's hand may be reached in through the notch 40 and the portion of the bag 60 remote from the twisted closure 62 is grasped and gently pulled out through the opening defined by the recess or notch 40. Inasmuch as the plastic bag slides over the inner edge of the notch 40, all of the oxygen, fish and water therein will be removed from the bag as it is pulled out from the interior of the container 14. If necessary, the container 14 may be raised slightly in order to facilitate access to the plastic bag 60. After the plastic bag has been removed, the oxygen therein is effectively entrapped in the upper portion of the compartment 46 while the lower portion thereof is provided with the water 56 and minnows 58.

Figure 9:
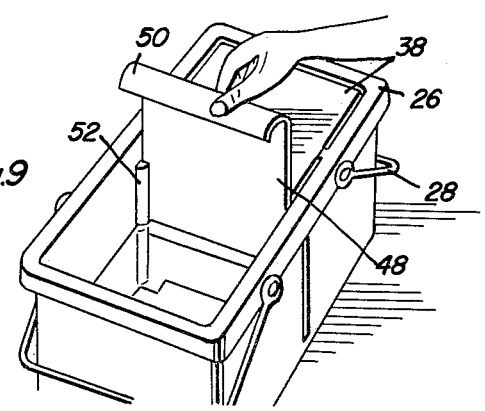
FIGURE 9 is a perspective view illustrating the use of the gate.

The gate 48 is then placed in position as illustrated in FIGURE 9 and the device is ready for use with the gate 48 serving to retain the minows in position and serving to enable one or two minnows to escape into the water 54 in the compartment 44 thus enabling the minnows to be employed for bait or for whatever purpose is desired. The plate 48 not only will retain the minnows in a desired orientation but will also prevent minnows from going back into the compartment 46 after entering the compartment 44 through the notch or recess 40.

Once the two containers have been properly assembled, the oxygen will be entrapped in the compartment 46 for a considerable period of time thus assuring an oxygen supply for the minnows and maintaining them in condition for use in the usual manner. The control gate may be employed for controlling the number of minnows allowed to escape from the inverted container 12 through the notch 40 and will form a closure therefor.

Figure 10:
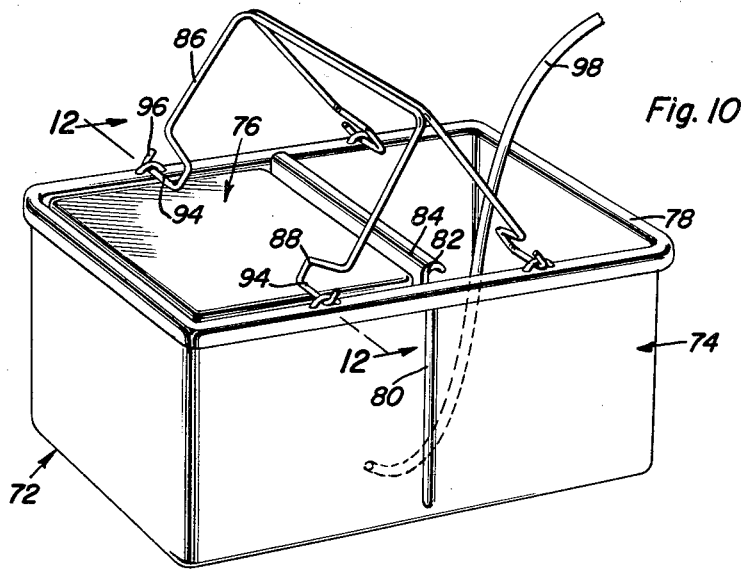
FIGURE 10 is a perspective view of a slightly modified form of the present invention.
Figure 11:
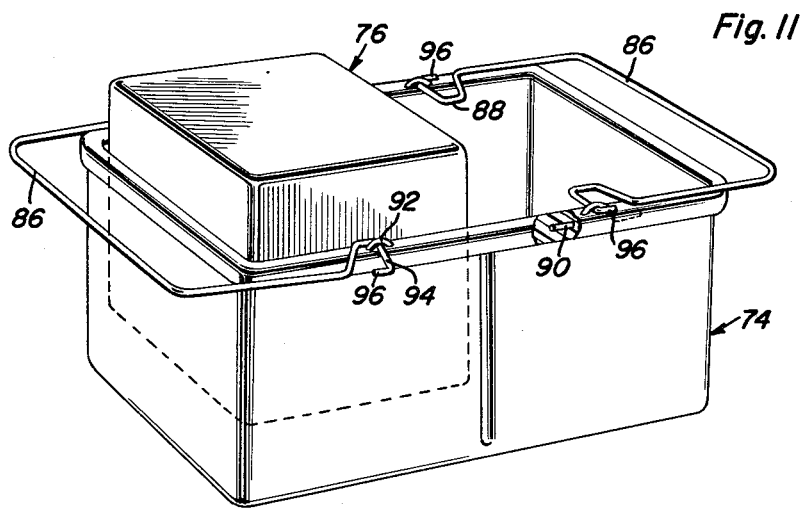
FIGURE 11 is a perspective view of the construction of FIGURE 10 illustrating the two containers partially assembled.
Figure 12:
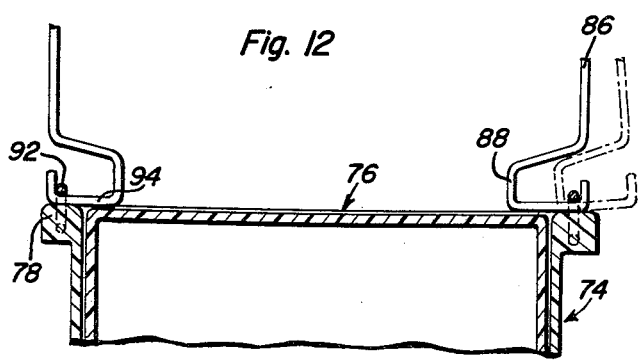
FIGURE 12 is a detailed sectional view taken substantially upon a plane passing along section line 12—12 of FIGURE 10 illustrating the relationship of the retaining handle and the smaller container.

FIGURES 10–12 illustrate another form of the invention which includes containers generally designated by numeral 74 and 76 which are equivalent to the containers 12 and 14 respectively. The container 74 is provided with a peripheral outwardly extending and downturned flange 78 at the top thereof and also a vertical rib or groove 80 of the inner surface thereof for engagement by a vertically sliding plate or gate 82 having a curved upper edge 84 forming a handle for manipulation of the plate. The relationship of the container 74, container 76 and gate 82 is substantially the same relationship as is disclosed in connection with the form of the invention in FIGURES 1–9. The container 76 which is inverted is held in place by the U-shaped conveyor or handle 86 which has an offset portion 88 adjacent the point of connection with the flange 78. The flange 78 is provided with a wire member 90 embedded therein which has an upwardly projecting eye member 92 disposed above the top surface of the flange 78 and slidably and pivotally receiving the terminal end 94 of the offset portion 88. The terminal portion 94 is provided with a perpendicular end 96 which limits the inward sliding movement of the portion 94 and the structure of the bail 86 is spring wire so that it is normally in a position with the end 96 engaged with the eye 92 and the major portion of the horizontal portion 94 overlies and engages the bottom of the inverted container 76 thus retaining the container in place. When the bail or handle 86 is pivoted downwardly to a generally horizontal position, the legs of the bail or handle 86 may be forced outwardly by exerting outward pressure thereon so that the offset portion 88 may be disposed in overlying relation to the flange 78 thereby permitting removal of or insertion of the inverted container 76. The movement of the offset portion 88 is illustrated in FIGURE 12 wherein the dotted line condition is the outermost position and the solid line condition is the innermost position and in this position, the horizontal portion 94 overlies the bottom of the inverted container 76 thus retaining the container in inverted condition.

The remainder of the structure may be the same and if it is desired to introduce an additional supply of oxygen or to introduce an original supply of oxygen, a suitable hose with a discharge nozzle may be employed and inserted under the edge of the container 76 disclosed below the surface of the water. The inlet hose and nozzle for the supply of oxygen or air is designated by numeral 98 and may be connected to any suitable source of supply.

The containers may be constructed of plastic material or any other suitable material and the bails or handles and the means for connecting the handles to the containers are preferably constructed of wire members. The manner of use of the invention will be the same as disclosed in conjunction with that form of the invention illustrated in FIGURES 1–9.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A minnow container comprising an enlarged open top container having peripheral side walls and a bottom, an inverted container disposed in said enlarged container, said inverted container including an open bottom resting on the bottom of the enlarged container and having a closed top disposed generally in the same horizontal plane as the top of the enlarged container, means releasably interconnecting the inverted container and the enlarged container for retaining the closed top of the inverted container in position therein, said inverted container having means defining an opening adjacent the open bottom thereof for communicating the interior of the inverted container with the remainder of the enlarged container, said inverted container adapted to receive a supply of minnows, a quantity of water and a supply of oxygen trapped above the water level in the inverted container, the remainder of the enlarged container having a supply of water therein, said opening being of such size that the minnows are accessible therethrough.

2. The structure as defined in claim 1 wherein said means defining the opening in the inverted container includes a notch in the lower edge of one wall of the inverted container.

3. The structure as defined in claim 1 wherein said enlarged container is provided with a pair of vertical guides adjacent the opposed side edges of the inverted container, a sliding gate engaged between the guides on the wall of the container for forming a closure for the means defining the opening at the lower end of the inverted container, said gate having a handle at the upper edge thereof in the same horizontal plane as the open top of the enlarged container when in closed position.

4. The structure as defined in claim 3 wherein said enlarged container is provided with a pair of pivotally supported inverted U-shaped bails for rendering the device easily portable.

5. The structure as defined in claim 1 wherein said means retaining the inverted container in place includes a pair of oppositely disposed inwardly extending friction lugs engageable with the closed top of the inverted container for retaining it in place until manually removed.

6. The method of maintaining minnows in live condition consisting of the steps of placing a supply of oxygen, water and minnows encased in a flexible waterproof bag in a container, inverting an enlarged container and placing it over the container having the plastic bag therein, inverting the assembled containers so that the enlarged container has an open area facing upwardly, placing a quantity of water in the enlarged container, reaching under the inverted container having the plastic bag therein and pulling the bottom of the plastic bag out from under the inverted container by moving it across the edge of the inverted container thereby entrapping the oxygen and minnows within the inverted container.

7. A minnow container comprising an enlarged open top container having peripheral side walls and a bottom, an inverted container disposed in said enlarged container and having a depth substantially equal to the depth of the enlarged container, said inverted container including an open bottom resting on the bottom of the enlarged container and having a closed top, means on said enlarged container engaging the closed top of the inverted container for releasably retaining the inverted container in inverted position within the enlarged container, said inverted container having means defining an opening adjacent the open bottom thereof for communicating the interior of the inverted container with the remainder of the enlarged container, said inverted container adapted to receive a supply of minnows, a quantity of water and a supply of oxygen trapped above the water level in the inverted container, the remainder of the enlarged container having a supply of water therein, said opening being of such size that the minnows are accessible therethrough.

8. The structure as defined in claim 7 wherein said means on the enlarged container for releasably retaining the inverted container in position includes a U-shaped bail, eye means on said enlarged container pivotally mounting the bail thereto adjacent opposite sides of the closed top of the inverted container, said bail including laterally offset portions normally overlying the closed top of the inverted container, said offset portion including a laterally movable end portion slidable in the eye means for movement of the offset portion into a position out of registry with the closed top of the inverted container thereby enabling the inverted container to be moved into and out of the enlarged container.

References Cited in the file of this patent

UNITED STATES PATENTS

| | | |
|---|---|---|
| 596,732 | Atsatt | Jan. 4, 1898 |
| 613,528 | Richmond | Nov. 1, 1898 |
| 1,136,092 | Blumer | Apr. 20, 1915 |
| 1,183,990 | Lau | May 23, 1916 |
| 2,963,814 | Zabrocki | Dec. 13, 1960 |

FOREIGN PATENTS

| | | |
|---|---|---|
| 1,174,591 | France | Nov. 3, 1958 |